United States Patent [19]

Pennebaker

[11] Patent Number: 4,532,503
[45] Date of Patent: Jul. 30, 1985

[54] SEQUENCE CONTROLLED PIXEL CONFIGURATION

[75] Inventor: William B. Pennebaker, Carmel, N.Y.

[73] Assignee: International Business Machines Corporation, Armonk, N.Y.

[21] Appl. No.: 440,114

[22] Filed: Nov. 8, 1982

[51] Int. Cl.$^3$ .............................................. G09G 1/16
[52] U.S. Cl. .................... 340/728; 340/747; 358/283
[58] Field of Search ............... 340/728, 747; 358/133, 358/283

[56] References Cited

U.S. PATENT DOCUMENTS

| | | | |
|---|---|---|---|
| 3,697,976 | 10/1972 | Fenton | 340/728 |
| 3,968,499 | 7/1976 | Lowe et al. | 346/110 R |
| 3,969,716 | 7/1976 | Roberts | 340/728 |
| 4,038,668 | 7/1977 | Quarton | 235/151 |
| 4,127,850 | 11/1978 | Vallins | 340/324 |
| 4,215,414 | 7/1980 | Huelsman | 340/728 |
| 4,222,048 | 9/1980 | Johnson | 340/747 |
| 4,231,032 | 10/1980 | Hara et al. | 340/703 |
| 4,237,457 | 12/1980 | Houldsworth | 340/728 |
| 4,250,502 | 2/1981 | Klauck et al. | 340/728 |
| 4,322,750 | 3/1982 | Lord et al. | 340/728 |
| 4,419,691 | 12/1983 | Sing et al. | 358/75 |
| 4,468,706 | 8/1984 | Cahill | 358/283 |
| 4,491,875 | 1/1985 | Kawamura | 358/283 |

OTHER PUBLICATIONS

IBM Technical Disclosure Bulletin, vol. 21, No. 9, Feb. 1979, pp. 3673-3674 "General Purpose Scan/Digitizing Method".

Primary Examiner—Marshall M. Curtis
Attorney, Agent, or Firm—Carl C. Kling

[57] ABSTRACT

Control of pixel configuration, as a function of pixel sequence as well as instantaneous pixel value, permits the use in displays of complex multi-bit pixel configurations with a minimum of optical aberrations.

The present pixel configuration is a function of the bit value (low order bit) of the neighbor pixel (previous pixel) as well as of the bit value of the present pixel. Each pixel is controlled by its own two-bit midtone selection value and, in addition, is controlled to the bit value of the low order bit of the previous pixel, according to a truth table.

The control circuitry includes a one-pixel interval delay latch which provides the bit value data for the low order bit of the prevous pixel as input to the pixel configurating decoder so that the pixel configurating decoder selects a pixel configuration as a composite function of previous pixel bit value and present pixel bit value.

Decoding of pixels according to this truth table tends to expand the black areas and white areas and minimizes the aberrational patterning of the transitional gray areas.

7 Claims, 5 Drawing Figures

| 00 | 00 | 01 | 00 | 11 | 10 | 00 |
|----|----|----|----|----|----|----|
| 00 | 00 | 00 | 00 | 11 | 01 | 00 |
| 00 | 11 | 00 | 11 | 01 | 00 | 00 |
| 00 | 10 | 00 | 11 | 01 | 10 | 00 |
| 00 | 00 | 00 | 11 | 01 | 00 | 00 |
| 00 | 10 | 11 | 10 | 01 | 00 | 00 |
| 00 | 01 | 11 | 00 | 00 | 00 | 00 |

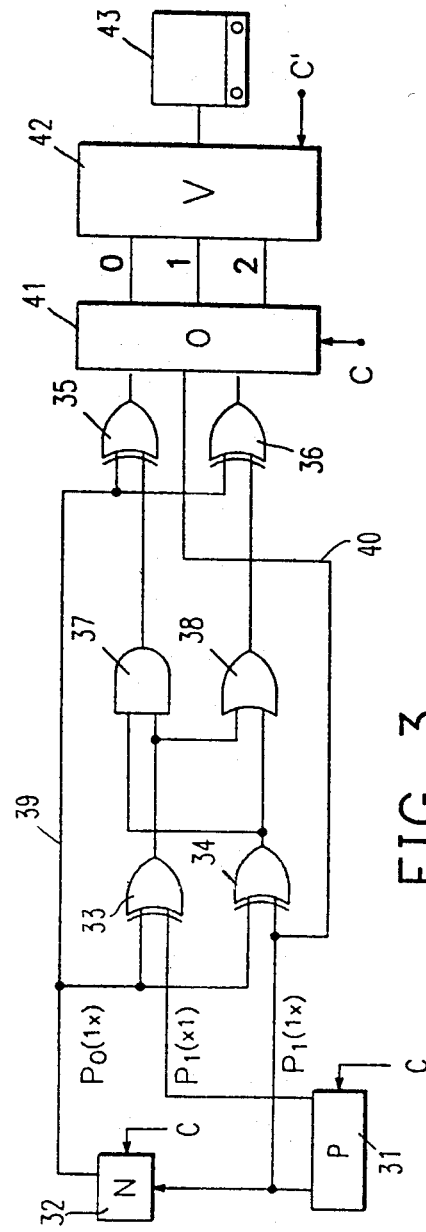

FIG. 2A

| | | | | | | |
|---|---|---|---|---|---|---|
| 00 | 00 | 00 | 00 | 00 | 00 | 00 |
| 00 | 00 | 00 | 10 | 00 | 01 | 10 |
| 00 | 01 | 01 | 01 | 11 | 11 | |
| 00 | 10 | 11 | 11 | 11 | 00 | 00 |
| 11 | 11 | 00 | 00 | 00 | 00 | 01 |
| 01 | 10 | 00 | 10 | 11 | 00 | 00 |
| 00 | 00 | 00 | 00 | 00 | 00 | 00 |

SEQUENCE CONTROLLED PIXEL CONFIGURATION

BACKGROUND OF THE INVENTION

1. Field of the Invention

The invention relates to electro-optical displays, and particularly to an improved pixel configuration and control circuits to provide different pixel configurations for different pixel midtone sequences and thus minimize optical aberrations, such as stairstepping and fuzzy black-white transitions.

2. Description of the Prior Art

Picture elements (pixels) may have simple binary configurations typified by the off/on lamp binary of the theater marquee. Pixel configurations have progressed from the binary 1,0 to midtone configurations based upon three-unit (0,1,2) or other multi-unit side-by-side placement of picture element components.

A typical two-bit specified side-by-side tone pixel configuration in the prior art is:

| Bit Value | Pixel |
|---|---|
| 0,0 | 0<u>12</u> White White White |
| 0,1 | 0<u>12</u> White Black White |
| 1,0 | 0<u>12</u> Black Black White |
| 1,1 | 012 Black Black Black |

Multi-unit pixel configurations may define pixels with many variations of color and gray tone shading. Resolution may be increased as a function of increased use of storage.

Data compression systems involving various gray scale filtering techniques are discussed under the subheading "Description of the Prior Art" in copending U.S. patent application of W. B. Pennebaker and K. S. Pennington, Ser. No. 429,658, filed Sept. 30, 1982, entitled "DATA FILTER AND COMPRESSION APPARATUS AND METHOD."

Multi-unit pixel configurations permit the production of complex displays with midtones ranging from black through several colors and shades of gray to white—but multi-unit pixel configurations have a tendency to develop optical aberrations due to random patterns in open fields and at the transition edges where tones change, for example where black meets white. Such aberrations may appear as lines or stairsteps and are generally undesirable; even in the absence of other aberrational optical patterns it is an undesirable aberration for a black-white transition to be fuzzy.

SUMMARY OF THE INVENTION

The invention is a sequence controlled tone and midtone pixel configuration, for electro-optical displays, in which the present pixel configuration is a function of the composite bit value of the neighbor pixel and also the present pixel. This composite sequence controlled pixel configuration tends to have reduced optical aberrations.

The sequence controlled pixel configuration for display is defined by a composite of the tone selection value for the present pixel and a function of the tone selection value of the previous pixel, according to a truth table which provides for a mid-tone pixel to be configured for optimum match to its neighbor pixel.

The optimum in most applications is for sharp black-white transitions; the tone pixel is controlled so its black portion generally is adjacent to a black neighbor pixel edge and its white portion is generally adjacent to a white neighbor pixel edge.

The control circuitry includes a one-pixel-interval shunt which provides selection value data for the neighbor pixel as input to the pixel configurator, along with the present pixel tone selection value, so that the pixel configurator selects a pixel configuration as a composite function of neighbor pixel bit value and present pixel bit value.

It is an object of the invention to maximize the adjacency of a tone component of the present pixel (e.g., black) to the same component of a neighbor pixel, so as to reduce the number of component transitions in a picture and thus to optimize sharpness of tone transitions (e.g., black to white).

Another object of the invention is to reduce the occurrence of optical aberrations in midtone fields.

BRIEF DESCRIPTION OF THE DRAWINGS

FIG. 1 is a chart of the sequence controlled pixel configuration of this invention.

FIG. 2 is a three-chart composite (FIGS. 2A—2B—2C) showing a representative result of this sequence controlled pixel configuration (FIG. 2A), of a prior art binary pixel configuration (FIG. 2B), and of a typical prior art halftone pixel configuration (FIG. 2C).

FIG. 3 is a schematic diagram of control circuitry according to the invention.

DESCRIPTION OF THE PREFERRED EMBODIMENT

FIG. 1 is a sequence controlled pixel configuration bit value truth table. The three-bit composite value of the present pixel $P_1$ (two bits) and the high order bit of the neighbor pixel $P_0$ mandates the configuration of the three-unit display pixel as a composite function of present pixel and neighbor pixel.

Where all black or all white are called for, the truth table shows that the neighbor pixel configuration does not matter. In midtones, however, the value of the neighbor pixel mandates whether a white-right midtone or a black-right midtone is to be used for the display pixel. The visual effect of the midtones in an open field is a gray which may be visually similar to the printed halftone; the visual effect of a midtone with its black (or white) portion matched to the black (or white) edge of its neighbor pixel is that of a sharp black-white transition in adjacent display pixels.

Figure 2A:
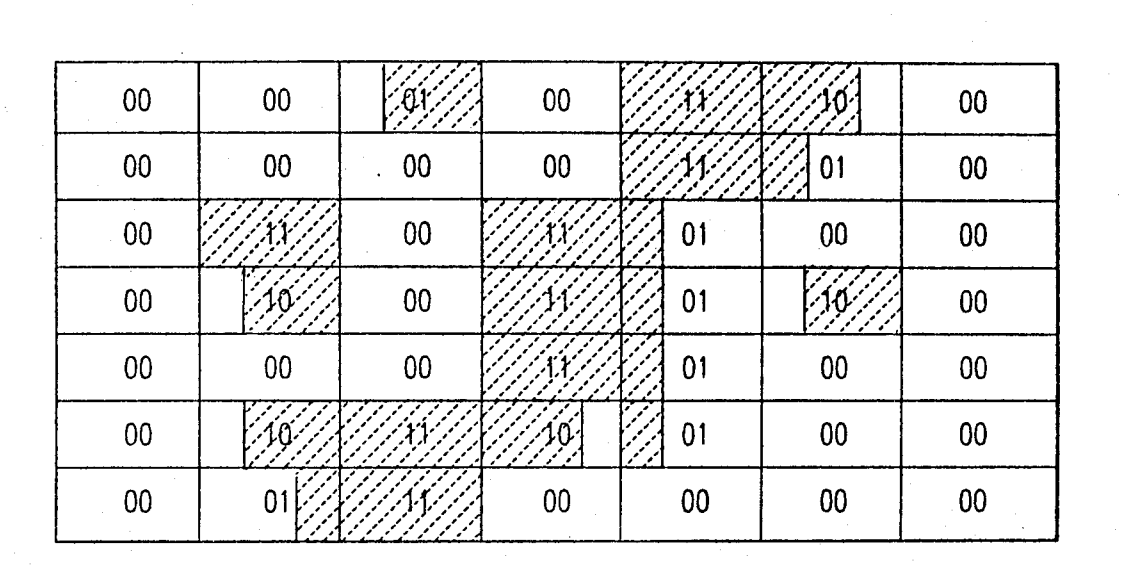

FIG. 2A illustrates a representative pattern display according to the sequential three-unit display pixel configuration of this invention. Note that there are few open field midtone (gray) areas; the black and white display areas tend to be sharp. There is no distinguishable aberrational pattern within the midtone areas.

FIG. 2B illustrates the same pattern in binary pixel format. The pattern, while generally sharp black or white, is quite lacking in resolution as contrasted to the pattern of FIG. 2A.

Figure 2C:
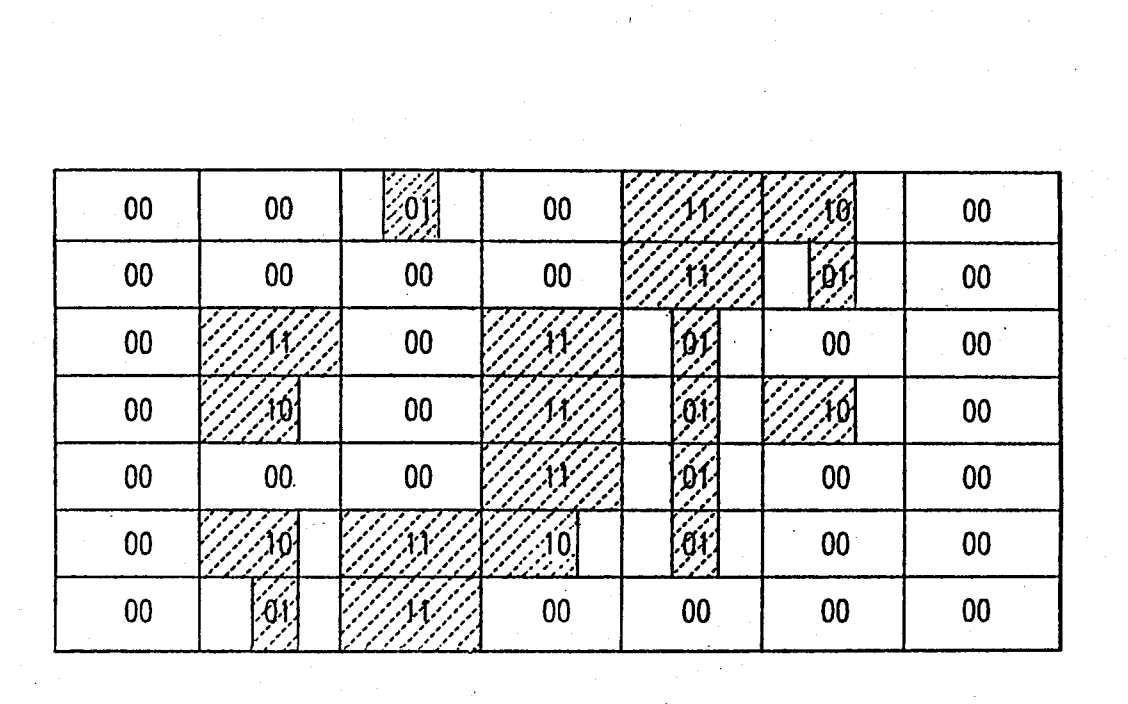

FIG. 2C illustrates the same pattern in nonsequential three-unit pixel configuration according to prior art. Note the relatively large islands of white and black in the open field midtone areas and the relatively high levels of transition fuzziness.

FIG. 3 is a block diagram of a preferred embodiment of a display system according to the invention, with detail logic for the sequence controlled pixel decoding means. Reference characters in FIG. 3 start with number 31, to avoid confusion with bit values and pixel definition signals. Input means includes pixel (P) register 31, which provides to the pixel decoding means the bit signals defining the present pixel. The high order bit signal of the present pixel register 31 also connects as input to neighbor pixel register 32, which provides a one-cycle delay. First, second, third and fourth exclusive-OR circuits 33, 34, 35 and 36, together with AND circuit 37 and OR circuit 38, and connections 39 and 40, complete the sequence controlled decoding means; these logical devices provide pixel definition signals 0—1—2 at output means output (O) register 41. Output register 41 provides pixel definition signals for use by video data selection mechanism 42, which may be of various known types. Clock signals C control timing through the sequence controlled pixel decoding means. For simple raster scan video presentation, the clock may be set to control serial data flow to the output by a clock signal C, whereupon a different clock signal C' takes over to control the video.

Parallel presentation merely requires a larger present pixel (P) register 31 and either scanning means to convert to serial, or replication of the sequence controlled pixel decoding logic in the sequence controlled pixel decoding means. In such a replicated logic pixel decoding means, neighbor pixel register positions are available from the (P) register at a neighboring position; simple logic to gate the high order position of the neighbor pixel along connector 39 synthesizes (N) register 32.

It is obvious that various inversions and complications of this invention might be made to accomplish variations in the desired result, depending upon the choice of white-right or black-right, number of units per display pixel, and whether a sharp black is desired or not. It might, for example, be advantageous in some circumstances to have stair-step edge patterns or fuzzy edges rather than to stifle them. Controlling pixel configuration according to pixel sequence is the subject matter of this invention, not the details of the selected truth table.

Midtones (and tones) may be gray (and white or black) or may be color tones in color displays.

Sequence may be time sequence, and in the usual video presentation is bit serial in time. Sequence may also be presentational, as in the first-second . . . nth pixel in a row, even though the whole row might be presented in parallel.

What is claimed is:

1. A plural tone pixel display system exhibiting minimized optical aberration as a result of tone-producing configuration within each pixel
    plural-bit-per pixel input means providing value signals defining a picture as a sequence of multi-unit plural-tone pixels, including a "present" pixel, which present pixel has a "neighbor" pixel spatially related in the picture, which present pixel in turn is a neighbor pixel to the next present pixel in the sequence the output means for supplying image signals;
    neighbor pixel sequence means, for providing a neighbor pixel value signal indicative of a tone characteristic of the neighbor pixel;
    sequence controlled pixel configuration decoding means, connected to said input means and to said neighbor pixel sequence means, to provide pixel configuring output signals to said output means as a composite function of neighbor pixel value signals from said neighbor pixel sequence means and of present pixel value signals from said input means; and
    present pixel means, connecting said input means to said neighbor pixel sequence means, for setting said neighbor pixel sequence means to a value which is a function of the value of the present pixel,
    whereby the output means is provided, for a representative pixel output, signals defining a present pixel configuration which is a function of the composite bit value of the neighbor pixel and also of the present pixel.

2. A display system according to claim 1,
further characterized in that
said system operates serially in time, one cycle per pixel; and said neighbor pixel sequence means includes a one-cycle delay, providing to said pixel configuration decoding means on a representative cycle one or more bits defining the neighbor pixel together with the bits defining the present pixel.

3. A display system according to claim 1,
further characterized in that
said system operates on a plurality of pixels in parallel; and said neighbor pixel sequence means includes for a representative present pixel one or more bits defining the neighbor pixel together with the bits defining the present pixel.

4. A display system according to claim 1,
further characterized in that
said neighbor pixel sequence means includes a register operative to develop a one-cycle delay, and said sequence controlled decoding means comprises;
first, second, third and fourth exclusive OR circuits, an AND circuit and an OR circuit;
first, second and third input nodes;
first, second and third output nodes;
means connecting said neighbor pixel sequence means as inputs to said first, second, third and fourth exclusive OR circuits;
means connecting one pixel bit position of said input means as input to said neighbor pixel sequence means, to said second exclusive OR circuits, and to said output means;
means connecting another pixel bit position to said first exclusive-OR circuit;
means connecting said neighbor pixel sequence means as input to each of said first, second, third and fourth exclusive-OR circuits;
means connecting each of said first and second exclusive OR circuit outputs respectively as inputs to said AND circuit and to said OR circuit;
means connecting the output of said AND circuit as input to said third exclusive OR circuit; and
means connecting the output of said OR circuit as input to said fourth exclusive OR circuit.

5. A display system according to claim 4,
further characterized in that
said system operates serially in time, one cycle per pixel, and said neighbor pixel sequence means includes a one-cycle delay, providing to said pixel configuration decoding means on a representative cycle one or more bits defining the neighbor pixel together with the bits defining the present pixel.

6. A display system according to claim 4,
further characterized in that
said system operates on a plurality of pixels in parallel, and said neighbor pixel sequence means includes for a representative present pixel one or more bits defining the neighbor pixel together with the bits defining the present pixel.

7. A method for configuring a mid-tone image of side-by-side tone pixels to exhibit minimal optical aberration as a result of tone-producing configuration within each pixel wherein each pixel of the image is represented by a signal containing a plurality of bits, and in which a present pixel has a neighbor pixel and is itself a neighbor pixel to another pixel comprising the steps of providing the pixel representing bits of the present pixel signal as input to a pixel coder;

providing a predetermined portion of the pixel representing bits of the neighbor pixel signal as input to said pixel coder; and coding the present pixel as a composite function of the present pixel signal and the neighbor pixel signal; whereby the position of tone components within the present pixel varies in response to the bit values of said predetermined portion of the pixel representing bits of the neighbor pixel signal.

* * * * *